(12) United States Patent
Takeuchi

(10) Patent No.: US 12,443,096 B2
(45) Date of Patent: Oct. 14, 2025

(54) PROJECTOR

(71) Applicant: SEIKO EPSON CORPORATION, Tokyo (JP)

(72) Inventor: Kaho Takeuchi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 404 days.

(21) Appl. No.: 18/184,784

(22) Filed: Mar. 16, 2023

(65) Prior Publication Data

US 2023/0296969 A1 Sep. 21, 2023

(30) Foreign Application Priority Data

Mar. 17, 2022 (JP) .................. 2022-042275

(51) Int. Cl.
*G03B 21/14* (2006.01)
*G03B 21/00* (2006.01)

(52) U.S. Cl.
CPC .......... *G03B 21/142* (2013.01); *G03B 21/006* (2013.01)

(58) Field of Classification Search
CPC ..... G03B 21/142; G03B 21/14; G03B 21/006
USPC ...................................... 353/82, 94
See application file for complete search history.

(56) References Cited

U.S. PATENT DOCUMENTS

| 7,079,327 | B2 | 7/2006 | Takatsuki |
| 7,746,563 | B2 | 6/2010 | Muramatsu et al. |
| 10,156,708 | B2 | 12/2018 | Minefuji |
| 11,269,249 | B2 | 3/2022 | Okada et al. |

FOREIGN PATENT DOCUMENTS

| JP | 2006-39005 A | 2/2006 |
| JP | 2008-3195 A | 1/2008 |
| JP | 2012-103278 A | 5/2012 |
| JP | 2018-66879 A | 4/2018 |
| KR | 100873138 B1 * | 12/2008 |
| WO | 2019/064977 A1 | 4/2019 |

OTHER PUBLICATIONS

Ono, Shuji, "New Imaging Technology to Expand the Shooting Chance", Imaging Technology Center, Research and Development Management Headquarters, Fujifilm Corporation.

* cited by examiner

*Primary Examiner* — Ryan D Howard
(74) *Attorney, Agent, or Firm* — Oliff PLC

(57) ABSTRACT

A projector has a light modulation device and a projection mechanism. The projection mechanism has a first optical system, a second optical system and a shift mechanism shifting the second optical system. The shift mechanism shifts the second optical system to a first position and a second position different from the first position in directions orthogonal to an optical axis of the second optical system.

9 Claims, 14 Drawing Sheets

PROJECTOR

The present application is based on, and claims priority from JP Application Serial Number 2022-042275, filed Mar. 17, 2022, the disclosure of which is hereby incorporated by reference herein in its entirety.

BACKGROUND

1. Technical Field

The present disclosure relates to a projector.

2. Related Art

WO/2019/064977 discloses a projector enlarging and projecting projection images respectively displayed in a first display area and a second display area of one image display device on a first plane and a second plane different from each other using a projection system. In WO/2019/064977, the first display area is larger than the second display area. The projection system includes a first optical system for projection on the first plane, a second optical system for projection on the second plane, and a common optical system entering the projection image displayed in the first display area of the image display device into the first optical system and entering the projection image displayed in the second display area of the image display device into the second optical system. The optical axis of the first optical system is aligned with the optical axis of the common optical system. The second optical system includes two mirrors provided in positions apart from the optical axis of the common optical system. A first image and a second image are simultaneously projected on the first plane and the second plane, respectively, in which a first angle of view of projection by the first optical system and the common optical system and a second angle of view of projection by the second optical system and the common optical system overlap.

In the above described projector, the image display device is divided into the first display area, the second display area, and an overlapping area. Therefore, the device is divided into the area projected on the first plane and the area projected on the second plane with respect to the planar dimension of the image display device, and the resolution may become significantly lower.

SUMMARY

In order to solve the above described problem, a projection system according to an aspect of the present disclosure includes a light modulation device forming a projection image, and a projection mechanism for enlarging and projecting a projection image light of the projection image output from the light modulation device, wherein the projection mechanism has a first optical system, a second optical system located between the first optical system and the light modulation device, and a shift mechanism shifting the second optical system relative to the light modulation device, the shift mechanism shifts the second optical system to a first position and a second position different from the first position in directions orthogonal to an optical axis of the second optical system, when the second optical system is in the first position, the projection mechanism passes the projection image light through a first projection system including the second optical system and the first optical system and projects a first enlarged image of the projection image on a first projection position, and, when the second optical system is in the second position, the projection mechanism passes the projection image light through a second projection system including only the second optical system and projects a second enlarged image of the projection image on a second projection position different from the first projection position at an angle of view different from an angle of view of the first projection system.

DESCRIPTION OF EXEMPLARY EMBODIMENTS

As below, a projector according to an embodiment of the present disclosure will be explained in detail with reference to the drawings.

Projector

Figure 1:
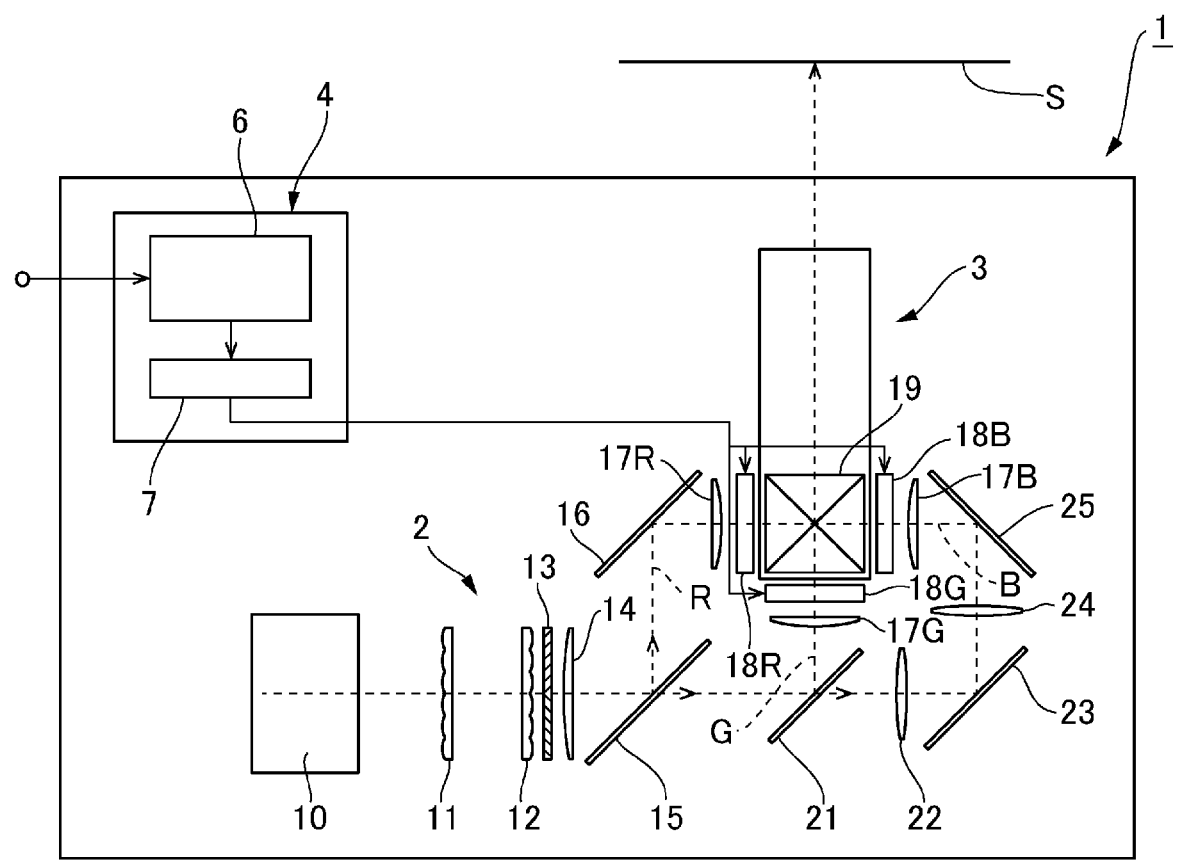
FIG. 1 shows a schematic configuration of a projector of the present disclosure.

FIG. 1 is a schematic configuration diagram of a projector including a projection mechanism 3 of the present disclosure. As shown in FIG. 1, a projector 1 includes an image formation section 2 forming a projection image to be projected on a screen S, the projection mechanism 3 enlarging and projecting a projection image light of the projection image output from the image formation section 2 on the screen S, and a control section 4 controlling operation of the image formation section 2.

Image Generation System and Control Unit

The image formation section 2 includes a light source 10, a first integrator lens 11, a second integrator lens 12, a polarization conversion element 13, and a superimposing lens 14. The light source 10 includes e.g., a super high-pressure mercury lamp, a solid-state light source, or the like. Each of the first integrator lens 11 and the second integrator lens 12 has a plurality of lens elements arranged in an array form. The first integrator lens 11 divides a luminous flux from the light source 10 into a plurality pieces. The lens elements of the first integrator lens 11 focus the luminous flux from the light source 10 on vicinities of the respective lens elements of the second integrator lens 12.

The polarization conversion element 13 converts the light from the second integrator lens 12 into predetermined linearly-polarized light. The superimposing lens 14 superimposes images of the individual lens elements of the first integrator lens 11 on display areas of a liquid crystal panel 18R, a liquid crystal panel 18G, and a liquid crystal panel 18B, which will be described later, via the second integrator lens 12.

Further, the image formation section 2 includes a first dichroic mirror 15, a reflection mirror 16, a field lens 17R, and the liquid crystal panel 18R. The first dichroic mirror 15 reflects R light as a part of the beam entering from the superimposing lens 14 and transmits G light and B light as a part of the beam entering from the superimposing lens 14. The R light reflected by the first dichroic mirror 15 enters the liquid crystal panel 18R via the reflection mirror 16 and the field lens 17R. The liquid crystal panel 18R is a light modulation device. The liquid crystal panel 18R modulates the R light according to an image signal and forms a red projection image.

Furthermore, the image formation section 2 includes a second dichroic mirror 21, a field lens 17G, and the liquid crystal panel 18G. The second dichroic mirror 21 reflects the G light as a part of the beam from the first dichroic mirror 15 and transmits the B light as a part of the beam from the first dichroic mirror 15. The G light reflected by the second dichroic mirror 21 enters the liquid crystal panel 18G via the field lens 17G. The liquid crystal panel 18G is a light modulation device. The liquid crystal panel 18G modulates the G light according to an image signal and forms a green projection image.

Moreover, the image formation section 2 includes a relay lens 22, a reflection mirror 23, a relay lens 24, a reflection mirror 25, a field lens 17B, and the liquid crystal panel 18B. The B light transmitted through the second dichroic mirror 21 enters the liquid crystal panel 18B via the relay lens 22, the reflection mirror 23, the relay lens 24, the reflection mirror 25, and the field lens 17B. The liquid crystal panel 18B is a light modulation device. The liquid crystal panel 18B modulates the B light according to an image signal and forms a blue projection image.

The liquid crystal panel 18R, the liquid crystal panel 18G, and the liquid crystal panel 18B surround a cross dichroic prism 19 from three directions. The cross dichroic prism 19 is a prism for combining lights and generates a projection image formed by combining the lights modulated by the individual liquid crystal panels 18R, 18G, 18B.

Here, the projection mechanism 3 projects an enlarged image formed by enlarging the projection image combined by the cross dichroic prism 19 (the projection image of the projection images formed by the respective liquid crystal panels 18R, 18G, 18B) on the screen S. The screen S is an enlargement side imaging surface of the projection mechanism 3.

The control section 4 includes an image processing section 6 to which an external image signal such as a video signal is input and a display drive section 7 driving the liquid crystal panel 18R, the liquid crystal panel 18G, and the liquid crystal panel 18B based on the image signals output from the image processing section 6.

The image processing section 6 converts image signals input from an external apparatus into image signals containing tones of the respective colors etc. The display drive section 7 operates the liquid crystal panel 18R, the liquid crystal panel 18G, and the liquid crystal panel 18B based on the projection image signals of the respective colors output from the image processing section 6. Thereby, the image processing section 6 displays the projection images corresponding to the image signals on the liquid crystal panel 18R, the liquid crystal panel 18G, and the liquid crystal panel 18B.

Projection Mechanism

As below, Examples 1 to 3 will be explained as configuration examples of the projection mechanism 3 provided in the projector 1. In Examples 1 to 3, the projection mechanism 3 includes a projection system 30 and a shift mechanism 41. The projection system 30 includes a first optical system 31 and a second optical system 32 located between the first optical system 31 and the liquid crystal panel 18. The shift mechanism 41 shifts the second optical system 32 in directions orthogonal to an optical axis N of the second optical system 32 relative to the liquid crystal panel 18.

Figure 2:
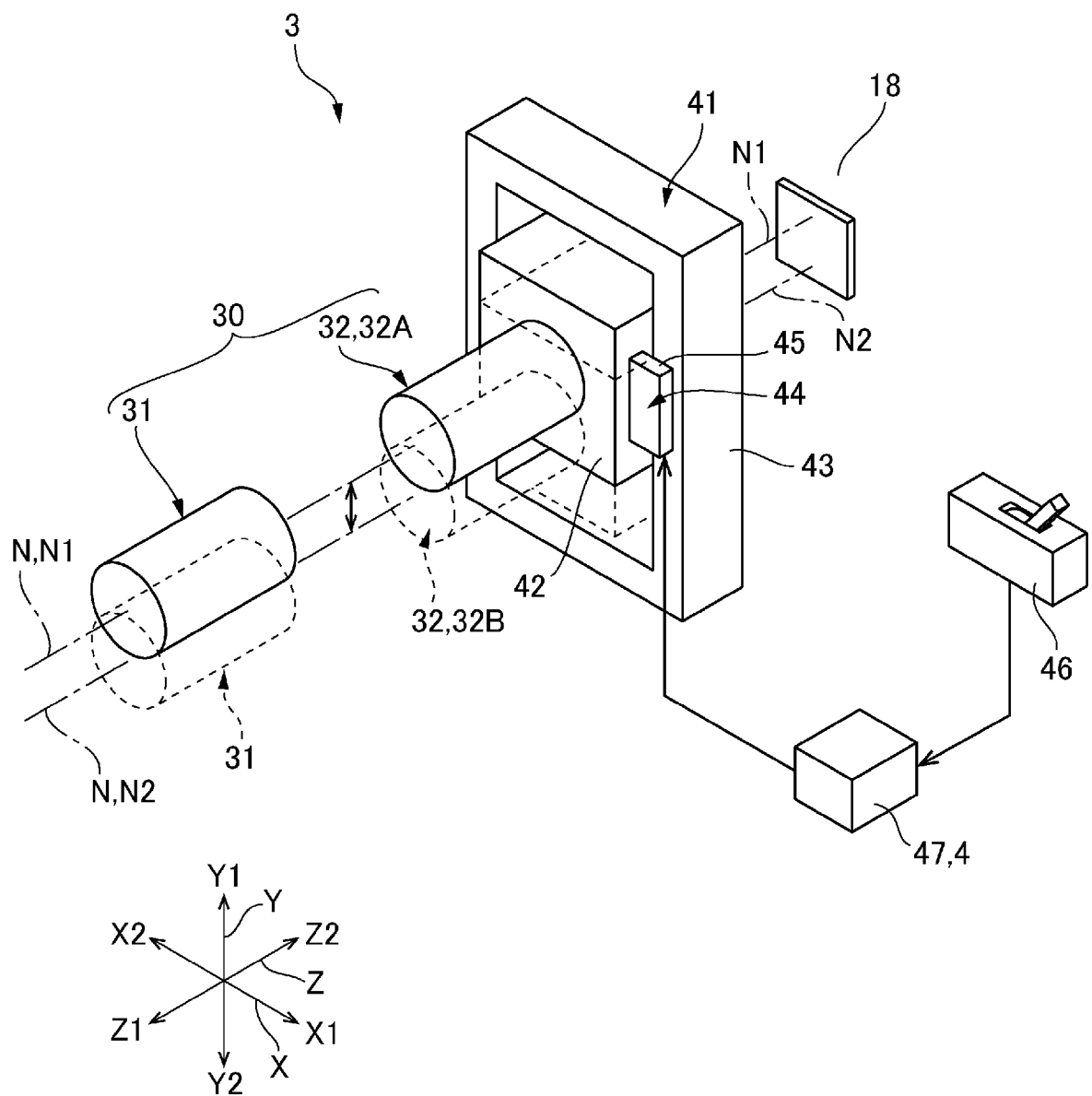
FIG. 2 is an explanatory diagram of a shift mechanism.

FIG. 2 is an explanatory diagram of the shift mechanism 41. As the shift mechanism 41, e.g., a holding portion 42 holding the second optical system 32 of the projection system 30, a supporting portion 43 movably supporting the holding portion 42 in the directions orthogonal to the optical axis N of the second optical system 32, and a drive mechanism 44 moving the holding portion 42 to a first position 32A or a second position 32B. In this example, when the holding portion 42 holding the second optical system 32 moves to the first position 32A or the second position 32B, the first optical system 31 moves integrally with the second optical system 32. That is, the holding portion 42 also holds the first optical system 31. Here, the optical axis N of the second optical system 32 is aligned with the optical axis of the first optical system 31. Further, the optical axis N of the second optical system 32 is also the optical axis N of the projection system 30. Therefore, in this example, the shift mechanism. 41 shifts the first optical system 31 and the second optical system 32 (projection system 30) in the directions orthogonal to the optical axis N of the projection system 30 relative to the liquid crystal panel 18.

In the following description, for convenience, three axes orthogonal to one another are an X-axis, a Y-axis, and a Z-axis. Further, the directions orthogonal to the optical axis N of the projection system 30 are Z-axis directions. In the Z-axis directions, a side at which the first optical system 31 is located is a first direction Z1 and a side at which the second optical system 32 is located is a second direction Z2. Upward and downward directions are Y-axis directions. In the Y-axis directions, one side is an upward direction Y1 and the other side is a downward direction Y2.

The drive mechanism 44 includes a drive unit 45 moving the holding portion 42 to the first position 32A or the second position 32B in the Y-axis directions. The drive mechanism 44 includes a selection unit 46 for selectively placing the projection system 30 in the first position 32A or the second position 32B. The drive unit 45 is a drive source such as a motor. The selection unit 46 is a switch for a user to select the individual positions of the projection system 30, or the like. Here, the control section 4 includes a shift control unit 47 drivingly controlling the drive unit 45. The shift control unit 47 stores position information of the holding portion 42 and drivingly controls the drive unit 45 to place the holding portion 42 in the first position 32A or the second position 32B based on the position information selected by the selection unit 46.

When the placement of the projection system 30 in the first position 32A is selected by the selection unit 46, the drive unit 45 is drivingly controlled to place the holding portion 42 in the first position 32A. Or, the placement of the projection system 30 in the second position 32B is selected by the selection unit 46, the drive unit 45 is drivingly controlled to place the projection system 30 in the second position 32B. Thereby, the shift mechanism 41 shifts the projection system 30 to the first position 32A or the second position 32B in the Y-axis directions.

When the projection system 30 is selected to be placed in the first position 32A, the shift mechanism 41 shifts the projection system 30 in the upward direction Y1. When the projection system 30 is selected to be placed in the second position 32B, the shift mechanism 41 shifts the projection system 30 in the downward direction Y2. Here, when the projection system 30 is in the first position 32A, an optical axis N1 of the projection system 30 is located in the upward direction Y1 of the liquid crystal panel 18 and, when the projection system 30 is in the second position 32B, an optical axis N2 of the projection system 30 is located in the downward direction Y2 of the liquid crystal panel 18. Note that the shift mechanism 41 may have a configuration shifting the projection system 30 in the X-axis directions.

In the description of the projection mechanisms of the individual examples 1 to 3, a form in which the projection system 30 is placed in the first position 32A is referred to as "first form" and a form in which the projection system 30 is placed in the second position 32B is referred to as "second form" and shown in parallel. Further, in the individual examples 1 to 3, in ray diagrams of the projection mechanisms, the liquid crystal panel 18R, the liquid crystal panel 18G, and the liquid crystal panel 18B are shown as the liquid crystal panel 18.

Example 1

Figure 3:
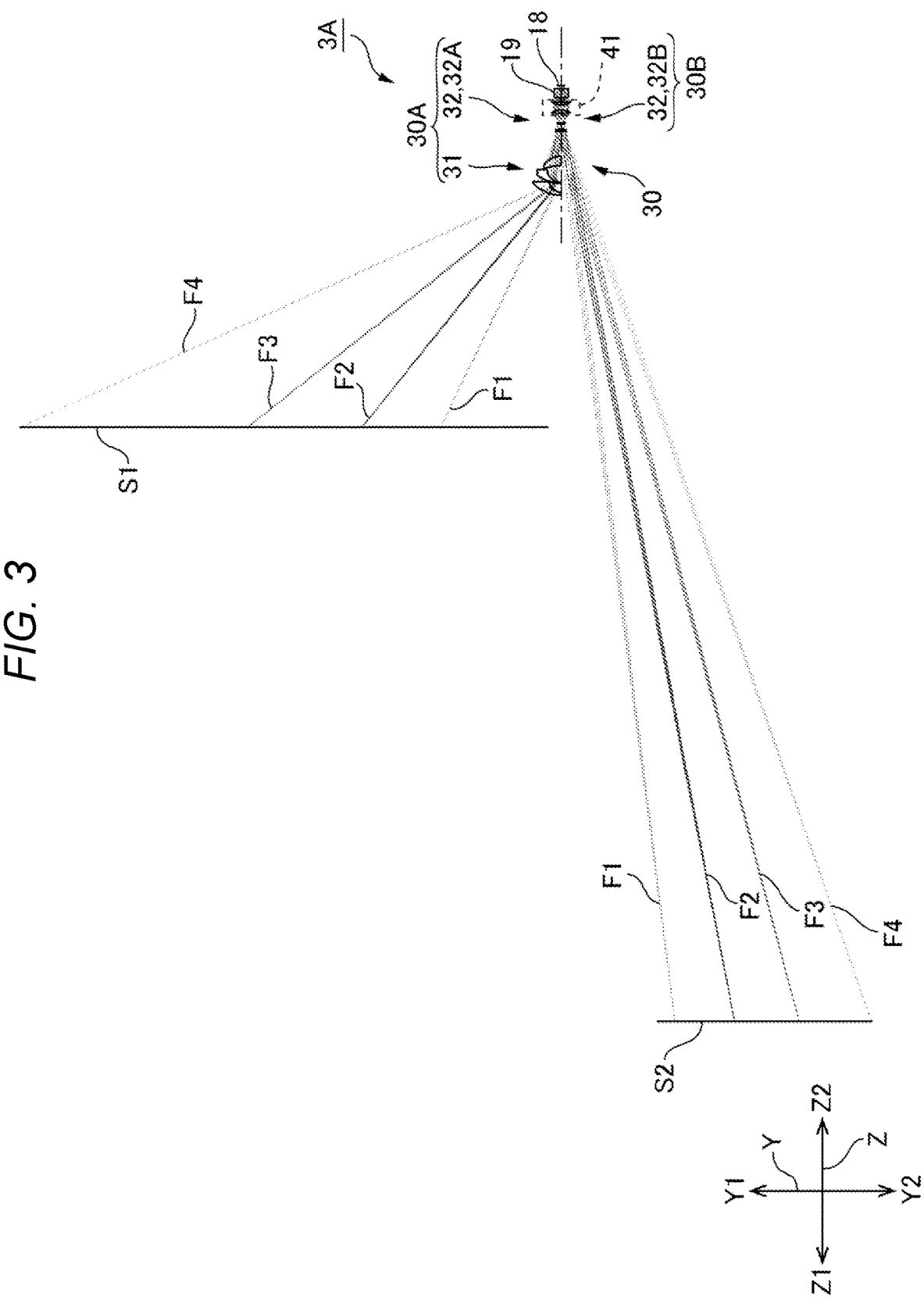
FIG. 3 is a ray diagram schematically showing an entire projection mechanism of Example 1.
Figure 4:
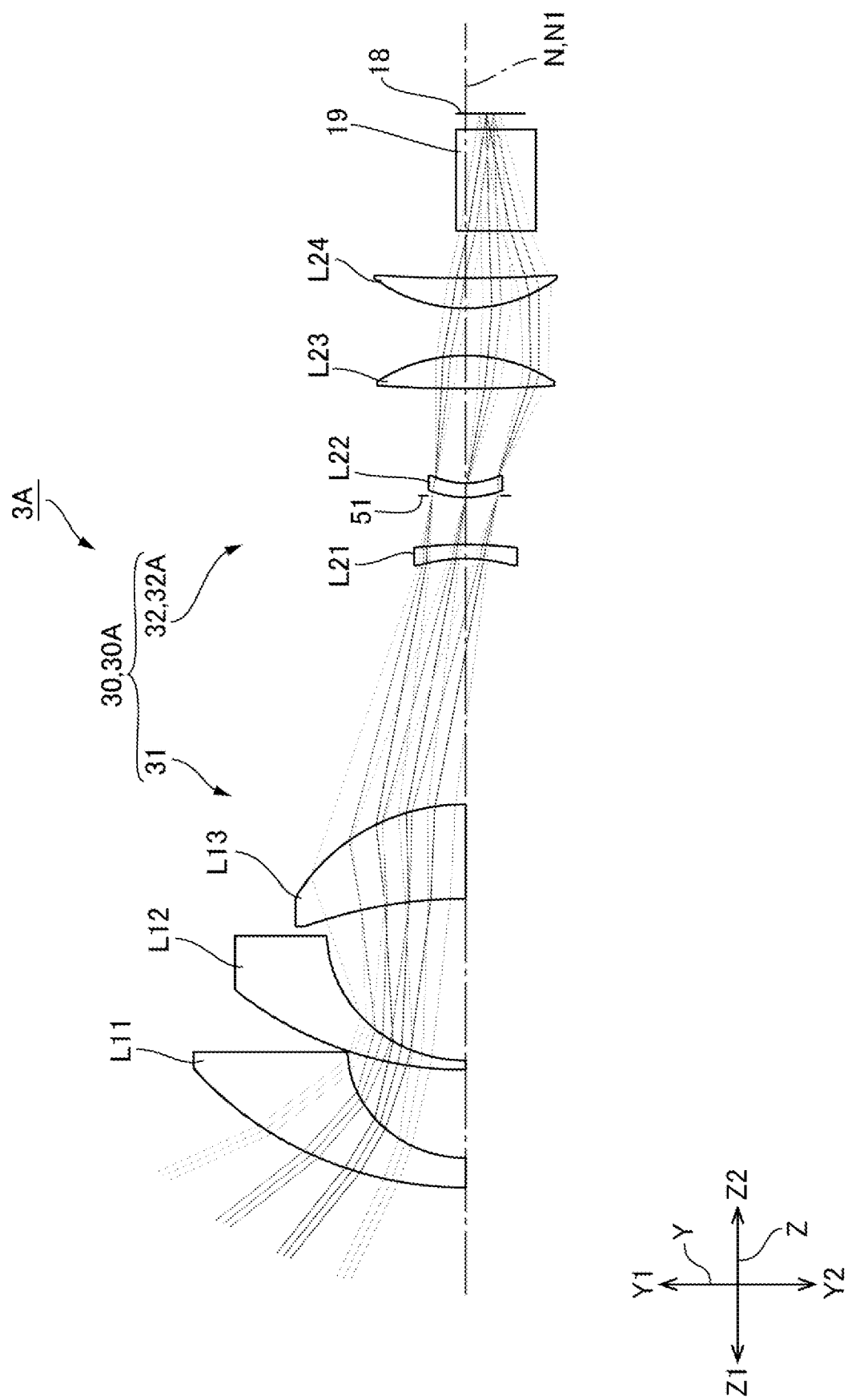
FIG. 4 is a ray diagram of the projection mechanism in a first form in Example 1.
Figure 5:
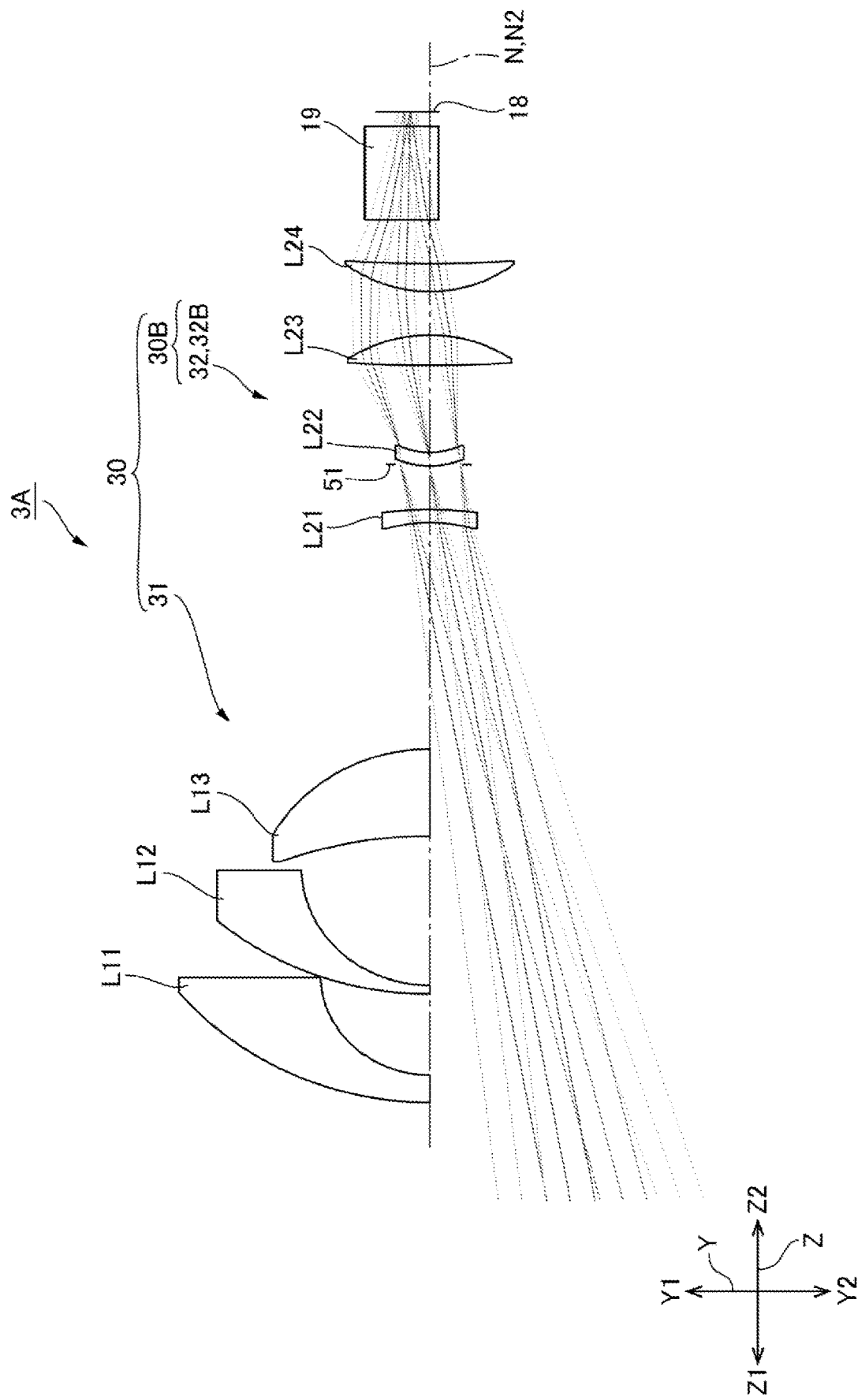
FIG. 5 is a ray diagram of the projection mechanism in a second form in Example 1.
Figure 6:
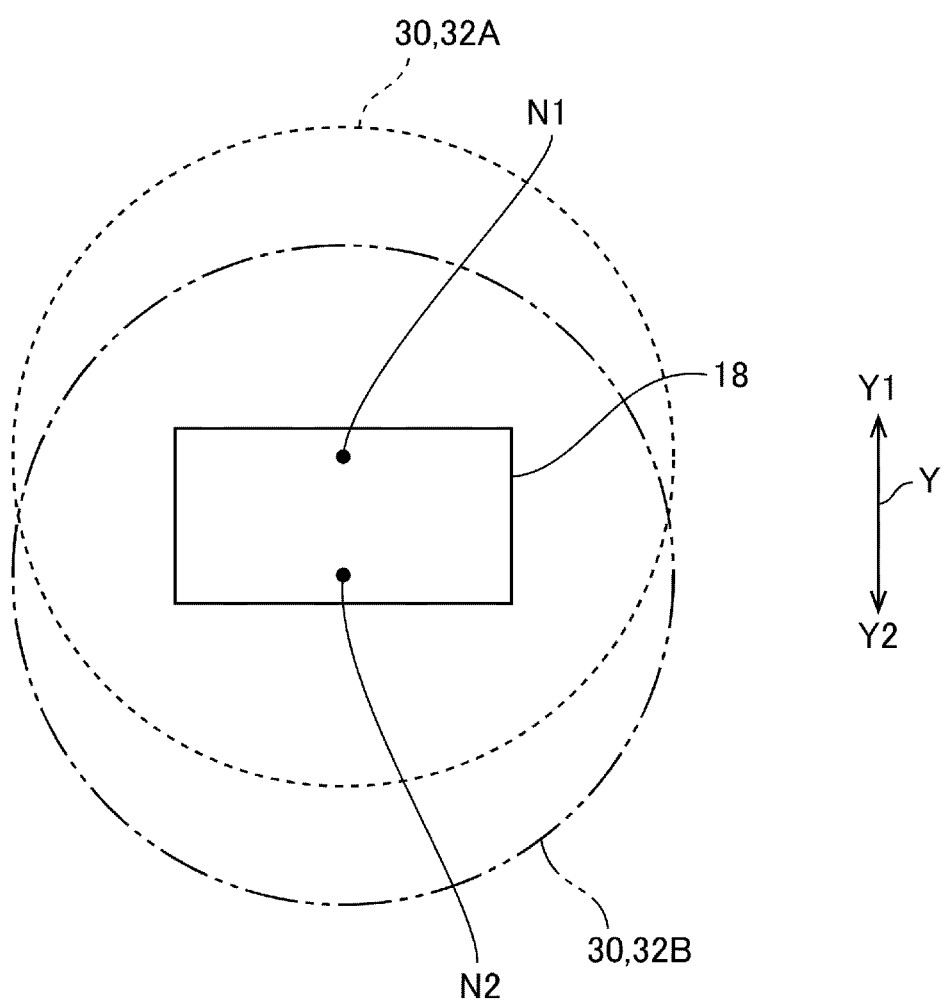
FIG. 6 is a diagram for explanation of a position relationship between a projection system and a display area of a liquid crystal panel.

FIG. 3 is a ray diagram schematically showing an entire projection mechanism 3A of Example 1. FIG. 4 is a ray diagram of the projection mechanism 3A in the first form of Example 1. FIG. 5 is a ray diagram of the projection mechanism in the second form of Example 1. FIG. 6 is a diagram for explanation of a position relationship between the projection system 30 and the display area of the liquid crystal panel 18. Note that, in FIG. 3, rays of the projection mechanism 3A in the first form and rays of the projection mechanism 3A in the second form are superimposed. In FIGS. 4 and 5, the shift mechanism is omitted. FIG. 6 schematically shows the outer shapes of the projection system 30 and the liquid crystal panel 18 in a plan view.

As shown in FIG. 3, the projection mechanism 3A projects a first enlarged image projected from the first optical system 31 on a first screen S1 located in a first projection position in the first form and projects a second enlarged image projected from the second optical system 32 on a second screen S2 located in a second position different from the first position in the second form. In this example, the first screen S1 and the second screen S2 are parallel and the first screen S1 is located in the second direction Z2 with respect to the second screen S2.

As shown in FIG. 3, the projection mechanism 3A of the first form and the projection mechanism 3A of the second form are different in angle of view, and the projection mechanism 3A of the first form can project at a wider angle than the projection mechanism 3A of the second form. In FIG. 3, luminous fluxes reaching the respective screens S from the projection mechanism 3A of this example are schematically shown by luminous fluxes F1 to F4. The luminous flux F1 is the luminous flux reaching a position at the lowest image height. The luminous flux F4 is the luminous flux reaching a position at the highest image height. The luminous fluxes F2 and F3 are luminous fluxes reaching positions between the luminous flux F1 and the luminous flux F4. Further, as shown in FIG. 3, a first projection distance of the projection mechanism 3A of the first form is shorter than a second projection distance of the projection mechanism 3A of the second form.

First Form of Example 1

As shown in FIGS. 3 and 4, in the projection mechanism 3A of the first form, the projection system 30 is placed in the first position 32A by the shift mechanism. In the projection mechanism 3A of the first form, a first projection system 30A including the first optical system 31 and the second optical system 32 is configured.

The liquid crystal panel 18 of the image formation section 2 is placed on a reduction side imaging surface of the first projection system 30A. The first screen S1 is placed on an enlargement side imaging surface of the first projection system 30A.

The first optical system 31 includes three lenses L11 to L13. The lenses L11 to L13 are placed in this order from the enlargement side toward the reduction side. The second optical system 32 includes four lenses L21 to L24. The lenses L21 to L24 are placed in this order from the enlargement side toward the reduction side. A diaphragm 51 is placed between the lens S21 and the lens L22. The diaphragm 51 is an aperture diaphragm set for defining the F number.

As shown in FIGS. 4 and 6, when the projection system 30 is in the first position 32A, the optical axis N1 of the projection system 30 is located in the upward direction Y1 of the liquid crystal panel 18. That is, the liquid crystal panel 18 is located in the downward direction Y2 with respect to the optical axis N1 of the projection system 30.

As shown in FIGS. 3 and 4, the beam output from the liquid crystal panel 18 passes through the second optical system 32, and then, travels in the upward direction Y1 of the optical axis N1. The beam output from the second optical system 32 passes through the first optical system 31, and then, is enlarged and projected in the upward direction Y1 and reaches the first screen S1. That is, the projection mechanism 3A passes the projection image light through the first projection system 30A including the second optical system 32 and the first optical system 31 and projects the first enlarged image on the first screen S1.

Second Form of Example 1

As shown in FIGS. 3 and 5, in the projection mechanism 3A of the second form, the projection system 30 is placed in the second position 32B by the shift mechanism. More specifically, when the projection system 30 is shifted from the first position 32A to the second position 32B, the projection system 30 is shifted in the downward direction Y2 by the shift mechanism and placed in the second position 32B. In the projection mechanism 3A of the second form, a second projection system 30B including only the second optical system 32 is configured.

The liquid crystal panel 18 of the image formation section 2 is placed on a reduction side imaging surface of the second projection system 30B. The second screen S2 is placed on an enlargement side imaging surface of the second projection system 30B.

As shown in FIGS. 5 and 6, when the projection system 30 is in the second position 32B, the optical axis N2 of the projection system 30 is located in the downward direction Y2 of the liquid crystal panel 18. That is, the liquid crystal panel 18 is located in the upward direction Y1 with respect to the optical axis N2 of the projection system 30. Note that the liquid crystal panel 18 forms the projection images in the same shape in the first form and the second form.

As shown in FIGS. 3 and 5, the beam output from the liquid crystal panel 18 passes through the second optical system 32, and then, is enlarged and projected in the downward direction Y2 of the optical axis N2 and reaches the second screen S2. That is, the projection mechanism 3A passes the projection image light through the second projection system 30B including only the second optical system 32 and projects the second enlarged image on the second screen S2 at an angle of view different from the angle of view of the first projection system 30A.

Lens Data

Lens data of the first projection system 30A in the first form are as below. The face numbers are sequentially assigned from the enlargement side toward the reduction side. The sign is a sign of the lens, the cross dichroic prism, or the liquid crystal panel. R is a radius of curvature. d is an axial surface separation. nd is a refractive index of d ray. vd is an Abbe's number of d ray. The units of R, d are mm.

| Sign | Face number | R | d | nd | vd |
|---|---|---|---|---|---|
| S1 | 0 | 0.00000 | 478.881632 | | |
| L11 | 1 | 70.00000 | 6.284397 | 1.743972 | 44.85 |
| | 2 | 23.48106 | 18.624820 | | |
| L12 | 3 | 70.00000 | 2.000000 | 1.743972 | 44.85 |
| | 4 | 27.58649 | 34.234393 | | |
| L13 | 5 | −89.48399 | 20.000000 | 1.668587 | 32.20 |
| | 6 | −38.52206 | 52.000000 | | |
| L21 | 7 | −30.83096 | 3.000000 | 1.493154 | 67.03 |
| | 8 | −75.13558 | 10.000000 | | |
| L22, 51 | 9 | 19.10319 | 3.000000 | 1.654590 | 33.24 |
| | 10 | 15.19880 | 20.000000 | | |
| L23 | 11 | 237.38194 | 7.000000 | 1.620410 | 60.32 |
| | 12 | −30.44543 | 10.000000 | | |
| L24 | 13 | 28.93771 | 6.394419 | 1.641320 | 56.50 |
| | 14 | 252.89129 | 10.000000 | | |
| 19 | 15 | 0.00000 | 24.720000 | 1.516800 | 64.17 |
| | 16 | 0.00000 | 0.100000 | | |
| 18 | 17 | 0.00000 | 0.000000 | | |

Further, when a focal distance is f, the projection distance is D, a half angle of view is θ, and the F number is Fn, the data of the first projection system 30A in the first form are as below.

f 6.4693 mm
D 478 mm
θ 64.0°
Fn 2.05

Lens data of the second projection system. 30B in the second form are as below. The face numbers are sequentially assigned from the enlargement side toward the reduction side. The sign is a sign of the lens, the cross dichroic prism, or the liquid crystal panel. R is a radius of curvature. d is an axial surface separation. nd is a refractive index of d ray. vd is an Abbe's number of d ray. The units of R, d are mm.

| Sign | Face number | R | d | nd | vd |
|---|---|---|---|---|---|
| S2 | 0 | 0.00000 | 1707.335643 | | |
| L21 | 7 | −30.83096 | 3.000000 | 1.493154 | 67.03 |
| | 8 | −75.13558 | 10.000000 | | |
| L22, 51 | 9 | 19.10319 | 3.000000 | 1.654590 | 33.24 |
| | 10 | 15.19880 | 20.000000 | | |
| L23 | 11 | 237.38194 | 7.000000 | 1.620410 | 60.32 |
| | 12 | −30.44543 | 10.000000 | | |
| L24 | 13 | 28.93771 | 6.394419 | 1.641320 | 56.50 |
| | 14 | 252.89129 | 10.000000 | | |
| 19 | 15 | 0.00000 | 24.720000 | 1.516800 | 64.17 |
| | 16 | 0.00000 | 0.100000 | | |
| 18 | 17 | 0.00000 | 0.000000 | | |

Further, when a focal distance is f, the projection distance is D, a half angle of view is θ, and the F number is Fn, the data of the second projection system 30B in the second form are as below.

f 23.3575 mm
D 1840 mm
θ 18.0°
Fn 2.05

Here, when the projection distance of the first projection system 30A is a first projection distance D1 and the projection distance of the second projection system 30B is a second projection distance D2, the second projection distance D2 is three or more times the first projection distance D1.

In this example, the first projection distance D1 is 478 mm and the second projection distance D2 is 1840 mm. Therefore, the second projection distance D2 is 3.85 times the first projection distance D1.

When the half angle of view of the first projection system 30A is a first angle of view and the half angle of view of the second projection system 30B is a second angle of view, the first angle of view is three or more times the second angle of view.

In this example, the first angle of view el is 64.0° and the second angle of view θ2 is 18.0°. Therefore, the first angle of view is 3.55 times the second angle of view.

Functions and Effects

The projector 1 of this example has the liquid crystal panel 18 forming the projection image and the projection mechanism 3 for enlarging and projecting the projection image light of the projection image output from the liquid crystal panel 18. The projection mechanism 3 has the first optical system 31, the second optical system 32 located between the first optical system 31 and the liquid crystal panel 18, and the shift mechanism 41 shifting the first optical system 31 and the second optical system 32 (projection system 30) relative to the liquid crystal panel 18. The shift mechanism 41 shifts the projection system 30 in the Y-axis directions orthogonal to the optical axis N of the second optical system 32 to the first position 32A and the second position 32B different from the first position 32A. When the projection system 30 is in the first position 32A, the projection mechanism 3 passes the projection image light through the first projection system 30A including the second optical system 32 and the first optical system 31 and projects the first enlarged image on the first screen S1 located in the first projection position. Further, when the projection system 30 is in the second position 32B, the projection mechanism 3 passes the projection image light through the second projection system 30B including only the second optical system 32 and projects the second enlarged image on the second screen S2 located in the second projection position at the angle of view different from the angle of view of the first projection system 30A. The liquid crystal panel 18 forms the projection images having the same shape when the first optical system 31 and the second optical system 32 are in the first position 32A and the second position 32B.

According to this example, in the projector in which the first projection system 30A and the second projection system 30B different in angle of view and projection position from each other are selectively changeable, the first projection system 30A and the second projection system 30B enlarge and project the projection image lights of the projection images having the same shape, and the resolution of the respective enlarged images projected on the first screen S1 and the second screen S2 may be made equal.

In this example, when the second optical system 32 is shifted by the shift mechanism 41, the first optical system 31 shifts integrally with the second optical system 32. Accordingly, compared to a configuration in which the first optical system 31 is fixed and only the second optical system 32 is shifted, misalignment of the optical axes of the first optical system 31 and the second optical system 32 may be suppressed.

Further, in this example, the second optical system 32 includes the diaphragm 51. Therefore, the second optical system 32 that the first projection system 30A and the second projection system 30B have in common includes the diaphragm 51, and thereby, the sizes of the luminous fluxes passing through the diaphragm 51 are equal in the first projection system 30A and the second projection system 30B. Thus, the F numbers of the first projection system 30A and the second projection system 30B may be made equal.

In this example, when the projection distance of the first projection system 30A is the first projection distance D1 and the projection distance of the second projection system 30B is the second projection distance D2, the second projection distance D2 is three or more times the first projection distance D1. Specifically, the second projection distance D2 is 3.85 times the first projection distance D1. Therefore, the projector 1 of this example may project enlarged images on two screens at largely different projection distances by selectively changing the first projection system 30A and the second projection system 30B.

In this example, when the half angle of view of the first projection system 30A is the first angle of view and the half angle of view of the second projection system 30B is the second angle of view, the first angle of view is three or more times the second angle of view. Specifically, the first angle of view is 3.55 times the second angle of view. Therefore, the projector 1 of this example may largely change the angle of view for projection by selectively changing the first projection system 30A and the second projection system 30B.

In this example, the shift mechanism. 41 includes the holding portion 42 holding the second optical system 32, the supporting portion 43 movably supporting the holding portion 42 in the Y-axis directions orthogonal to the optical axis N, and the drive unit 45 moving the holding portion 42 to place the projection system 30 in the first position 32A or the second position 32B. The control section 4 includes the shift control unit 47 drivingly controlling the drive unit 45 and placing the projection system 30 in the first position 32A or the second position 32B. Therefore, the projection system 30 may be movingly controlled in the first position 32A or the second position 32B by the shift control unit 47.

In this example, the shift mechanism 41 includes the selection unit 46 for selectively placing the projection system 30 in the first position 32A or the second position 32B. When the placement of the projection system 30 in the first position 32A is selected by the selection unit 46, the shift control unit 47 drivingly controls the drive unit 45 to place the projection system 30 in the first position 32A. Or, when the placement of the projection system 30 in the second position 32B is selected by the selection unit 46, the shift control unit 47 drivingly controls the drive unit 45 to place the second optical system 32 in the second position 32B. Therefore, the user may easily change the second optical system 32 to the individual positions by selecting the position of the projection system 30 using the selection unit 46.

Figure 7:
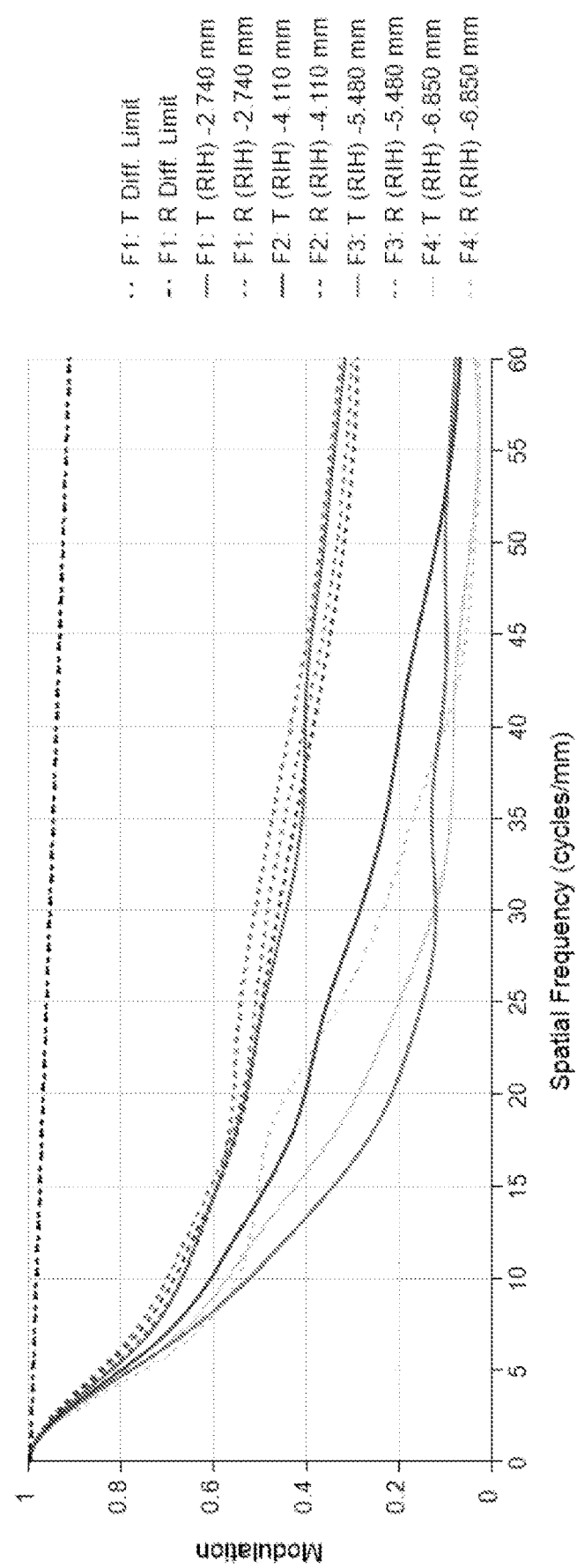
FIG. 7 shows MTF at an enlargement side of the projection mechanism in the first form in Example 1.
Figure 8:
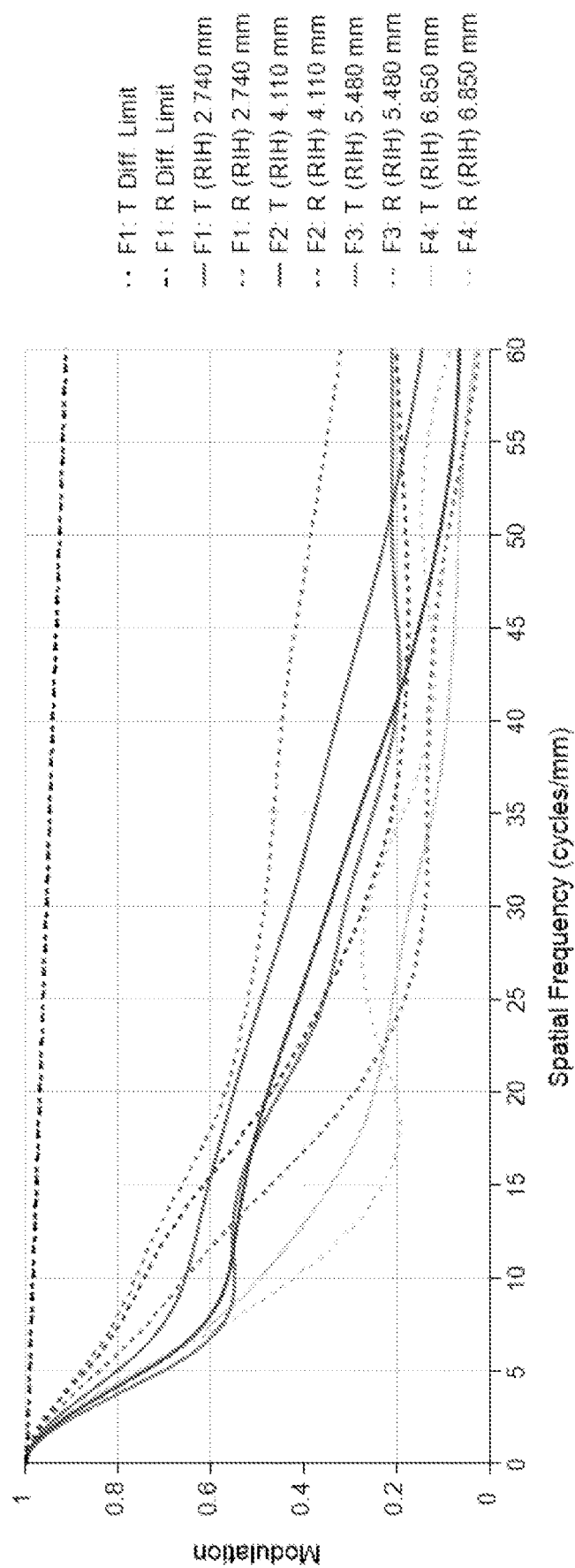
FIG. 8 shows MTF at an enlargement side of the projection mechanism in the second form in Example 1.

FIG. 7 shows MTF at the reduction side of the projection mechanism 3A in the first form. FIG. 8 shows MTF at the reduction side of the projection mechanism 3A in the second form. The horizontal axes in FIGS. 7 and 8 indicate spatial frequencies and the vertical axes indicate contrast reproduction ratios. As shown in FIGS. 7 and 8, the projection mechanism 3A in this example has higher resolution in the first form and the second form.

Example 2

Figure 9:
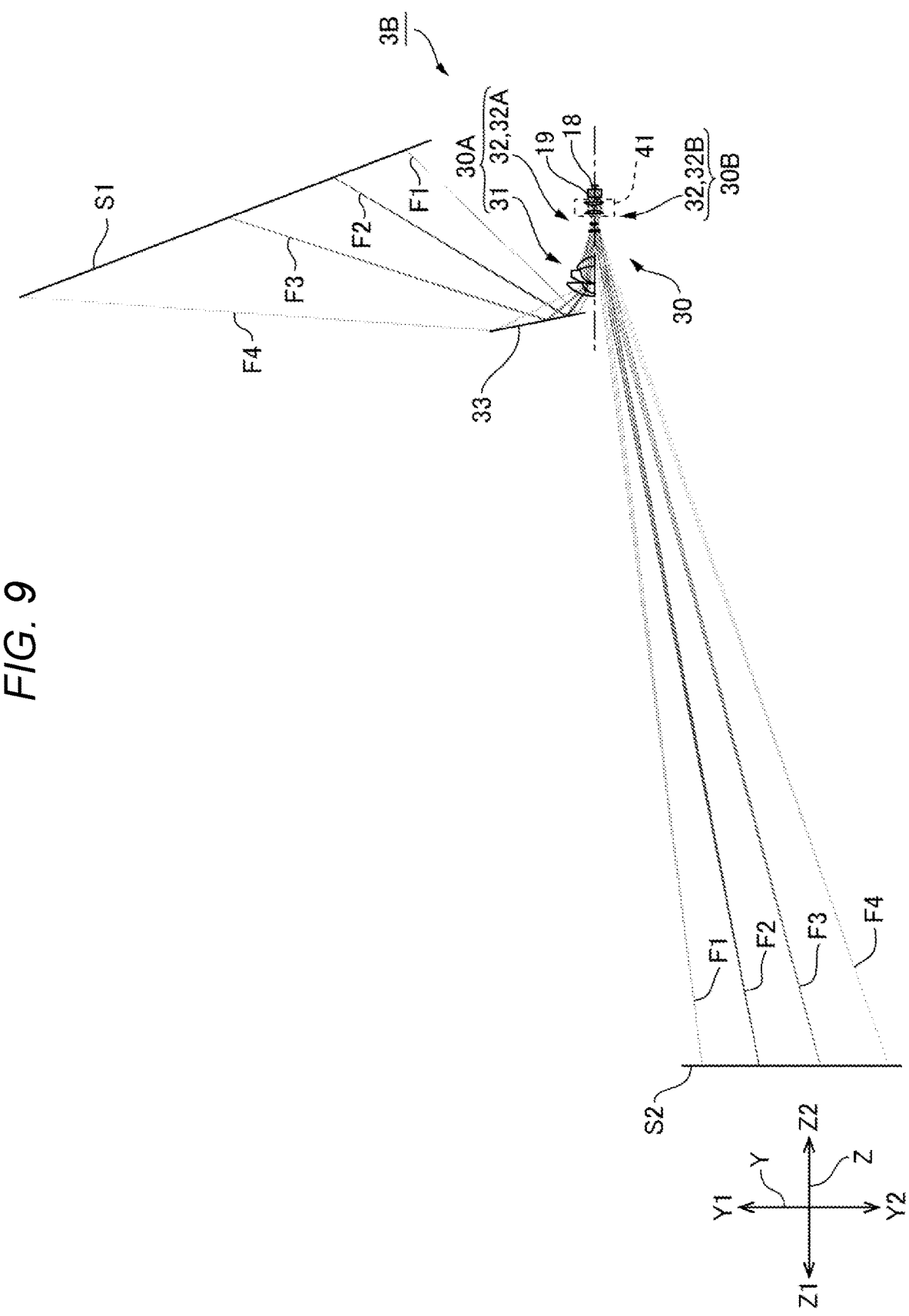
FIG. 9 is a ray diagram schematically showing an entire projection mechanism of Example 2.
Figure 10:
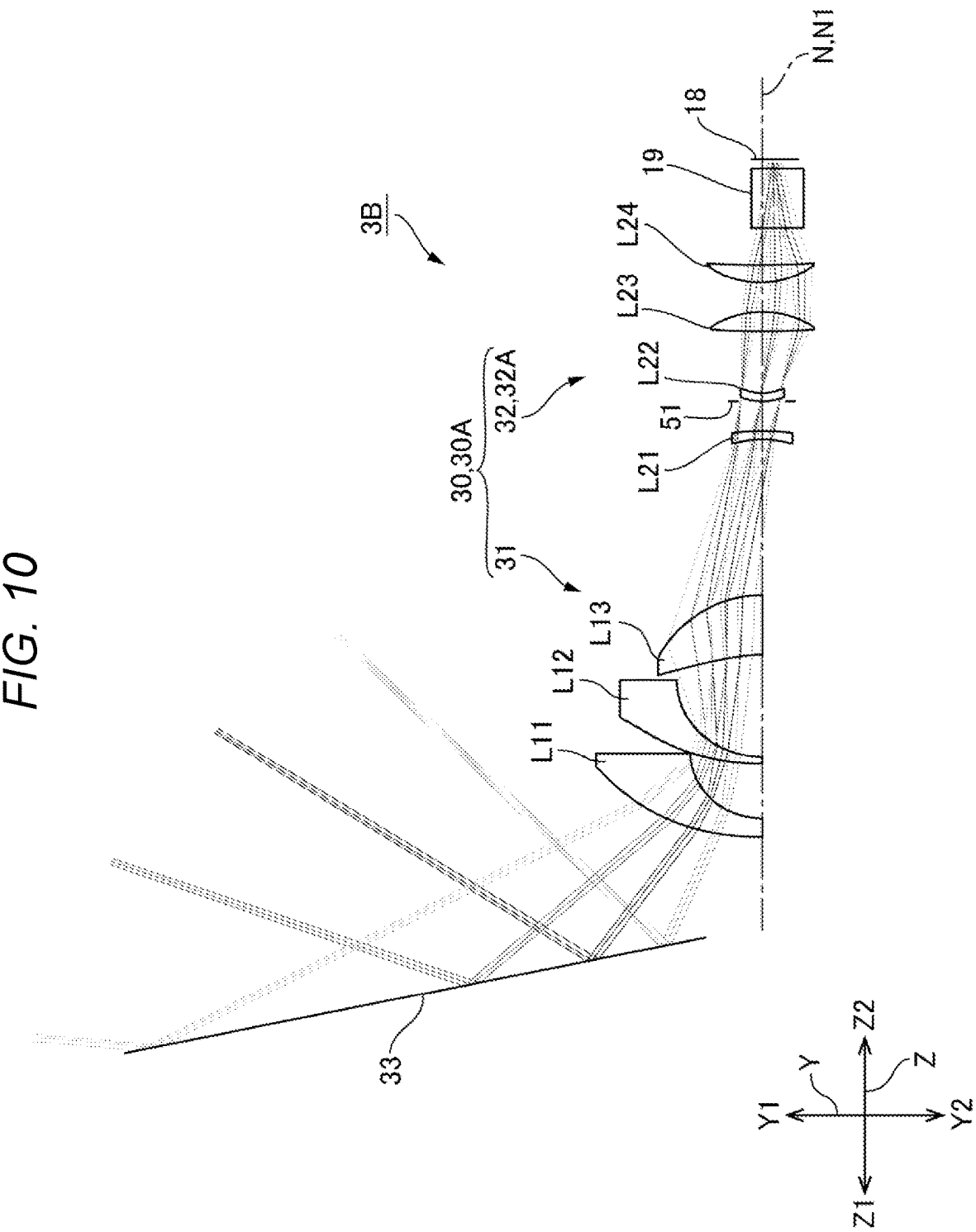
FIG. 10 is a ray diagram of the projection mechanism in a first form in Example 2.
Figure 11:
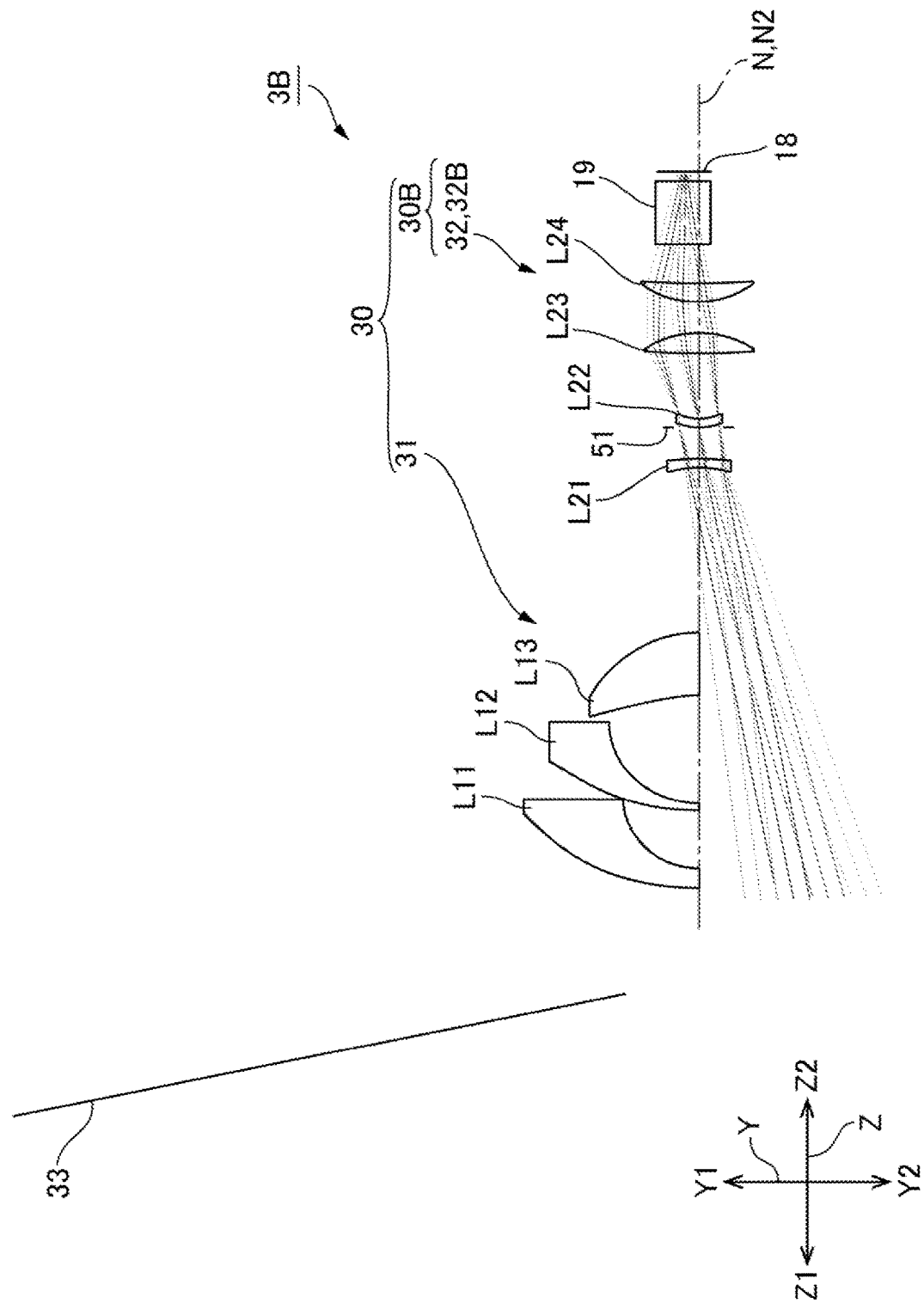
FIG. 11 is a ray diagram of the projection mechanism in a second form in Example 2.

FIG. 9 is a ray diagram schematically showing an entire projection mechanism 3B of Example 2. FIG. 10 is a ray diagram of the projection mechanism 3B in a first form of Example 2. FIG. 11 is a ray diagram of the projection mechanism 3B in a second form of Example 2. Note that, in FIG. 9, rays of the projection mechanism 3B in the first form and rays of the projection mechanism 3B in the second form are superimposed. The projection mechanism 3B of Example 2 is different from the projection mechanism 3A of Example 1 in that a first reflection member 33 is provided. Note that the other configurations of the projection mechanism 3B of Example 2 are the same as those of the projection mechanism 3A of Example 1 and the corresponding configurations have the same signs and the explanation thereof will be omitted.

As shown in FIG. 9, the projection mechanism 3B includes the first reflection member 33 placed at the enlargement side of the first projection system 30A and changing the projection direction of the first projection system 30A. The projection mechanism 3B deflects the projection direction of the first enlarged image projected from the first optical system 31 by the first reflection member 33 and projects the first enlarged image on the first screen S1 located in a first projection position in the first form and projects the second enlarged image projected from the second optical system 32 on the second screen S2 located in a second position different from the first position in the second form. In this example, the first screen S1 and the second screen S2 intersect and the first screen S1 is located in the upward direction Y1 of the second screen S2.

As shown in FIG. 9, the projection mechanism 3B of the first form and the projection mechanism 3B of the second form are different in angle of view, and the projection mechanism 3B of the first form can project at a wider angle than the projection mechanism 3B of the second form. In FIG. 9, luminous fluxes reaching the respective screens S from the projection mechanism 3B of this example are schematically shown by luminous fluxes F1 to F4. The luminous flux F1 is the luminous flux reaching a position at the lowest image height. The luminous flux F4 is the luminous flux reaching a position at the highest image height. The luminous fluxes F2 and F3 are luminous fluxes reaching positions between the luminous flux F1 and the luminous flux F4. Further, as shown in FIG. 9, the first projection distance of the projection mechanism 3B of the first form is shorter than the second projection distance of the projection mechanism 3B of the second form.

First Form of Example 2

As shown in FIGS. 9 and 10, in the projection mechanism 3B of the first form, the projection system 30 is placed in the first position 32A by the shift mechanism.

The first reflection member 33 is placed at the enlargement side of the first optical system 31. The first reflection member 33 is placed in the upward direction Y1 of the optical axis N of the projection system. 30 and in the first direction Z1 of the first optical system 31. The first reflection member 33 includes a planar mirror. The first reflection member 33 inclines in the downward direction Y2 toward the second direction Z2.

As shown in FIG. 10, when the projection system 30 is in the first position 32A, the optical axis N1 of the projection system 30 is located in the upward direction Y1 of the liquid crystal panel 18. That is, the liquid crystal panel 18 is located in the downward direction Y2 with respect to the optical axis N1 of the projection system 30.

As shown in FIGS. 9 and 10, the beam output from the liquid crystal panel 18 passes through the second optical system 32, and then, travels in the upward direction Y1 of the optical axis N1. The beam output from the second optical system 32 passes through the first optical system 31, and then, travels in the upward direction Y1. The beam output from the first optical system 31 is folded in the upward direction Y1 and the second direction Z2 by the first reflection member 33. The beam deflected in the projection direction by the first reflection member 33 is enlarged and projected in the upward direction Y1 and the second direction Z2 and reaches the first screen S1. That is, the projection mechanism 3B passes the projection image light through the first projection system 30A, including the second optical system 32 and the first optical system 31, and the first reflection member 33 and projects the first enlarged image on the first screen S1.

Second Form of Example 2

As shown in FIGS. 9 and 11, in the projection mechanism 3B of the second form, the projection system 30 is placed in the second position 32B by the shift mechanism.

As shown in FIG. 11, when the projection system 30 is in the second position 32B, the optical axis N2 of the projection system 30 is located in the downward direction Y2 of the liquid crystal panel 18. That is, the liquid crystal panel 18 is located in the upward direction Y1 with respect to the optical axis N2 of the projection system 30.

As shown in FIGS. 9 and 11, the beam output from the liquid crystal panel 18 passes through the second optical system 32, and then, is enlarged and projected in the downward direction Y2 of the optical axis N2 and reaches the second screen S2. That is, the projection mechanism 3B passes the projection image light through the second projection system 30B including only the second optical system 32 and projects the second enlarged image on the second screen S2 at an angle of view different from the angle of view of the first projection system 30A.

Functions and Effects

The projector 1 of this example includes the first reflection member 33 placed at the enlargement side of the first projection system 30A and changing the projection direction of the first projection system 30A. Accordingly, the projector 1 of this example may change the position of the first screen S1 by the first reflection member 33. Further, the projector 1 of this example has the same configurations as those of the projector 1 of Example 1 except that the projection mechanism 3B includes the first reflection member 33, and may obtain the same functions and effects as those of the projector 1 of Example 1.

Example 3

Figure 12:
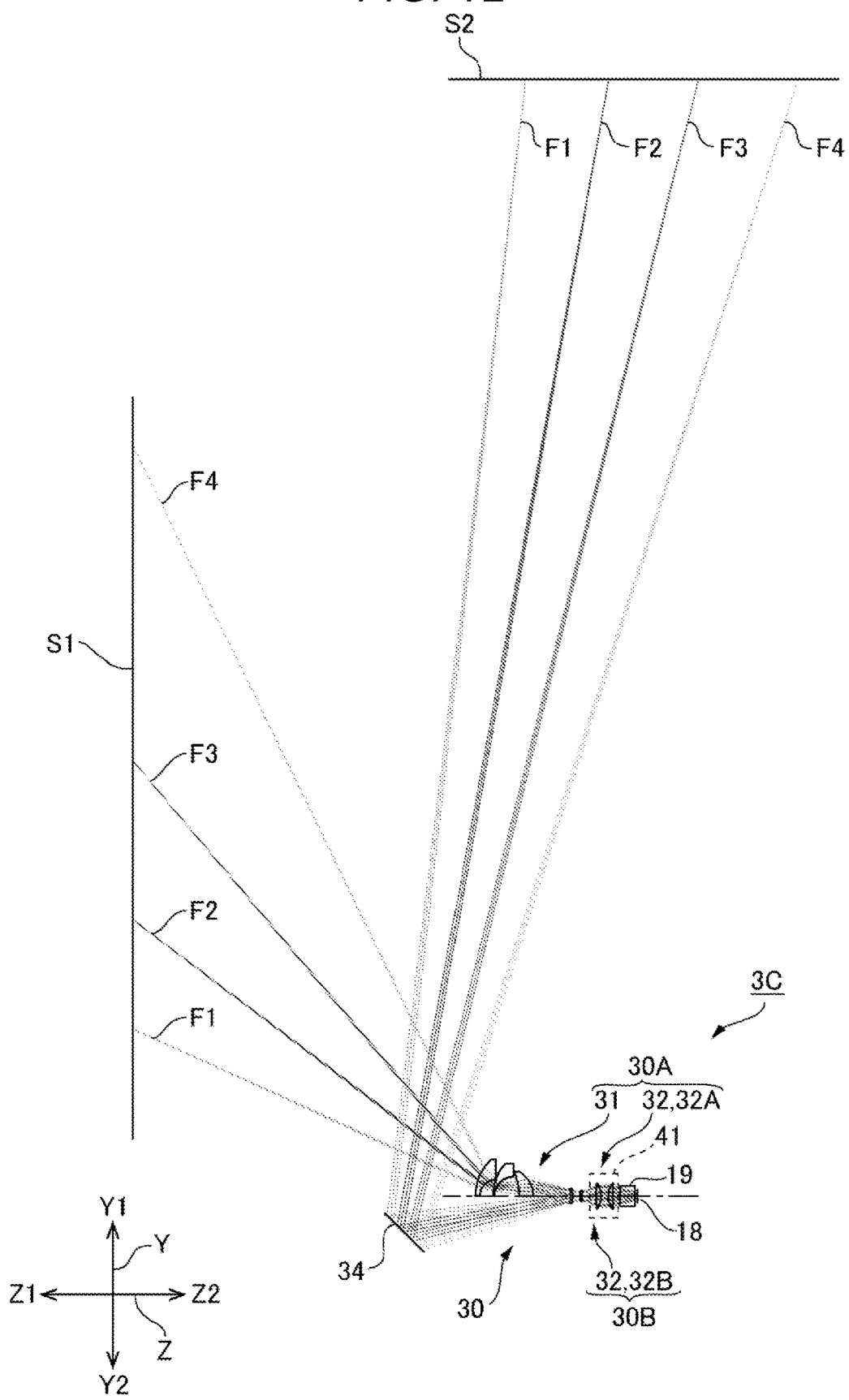
FIG. 12 is a ray diagram schematically showing an entire projection mechanism of Example 3.
Figure 13:
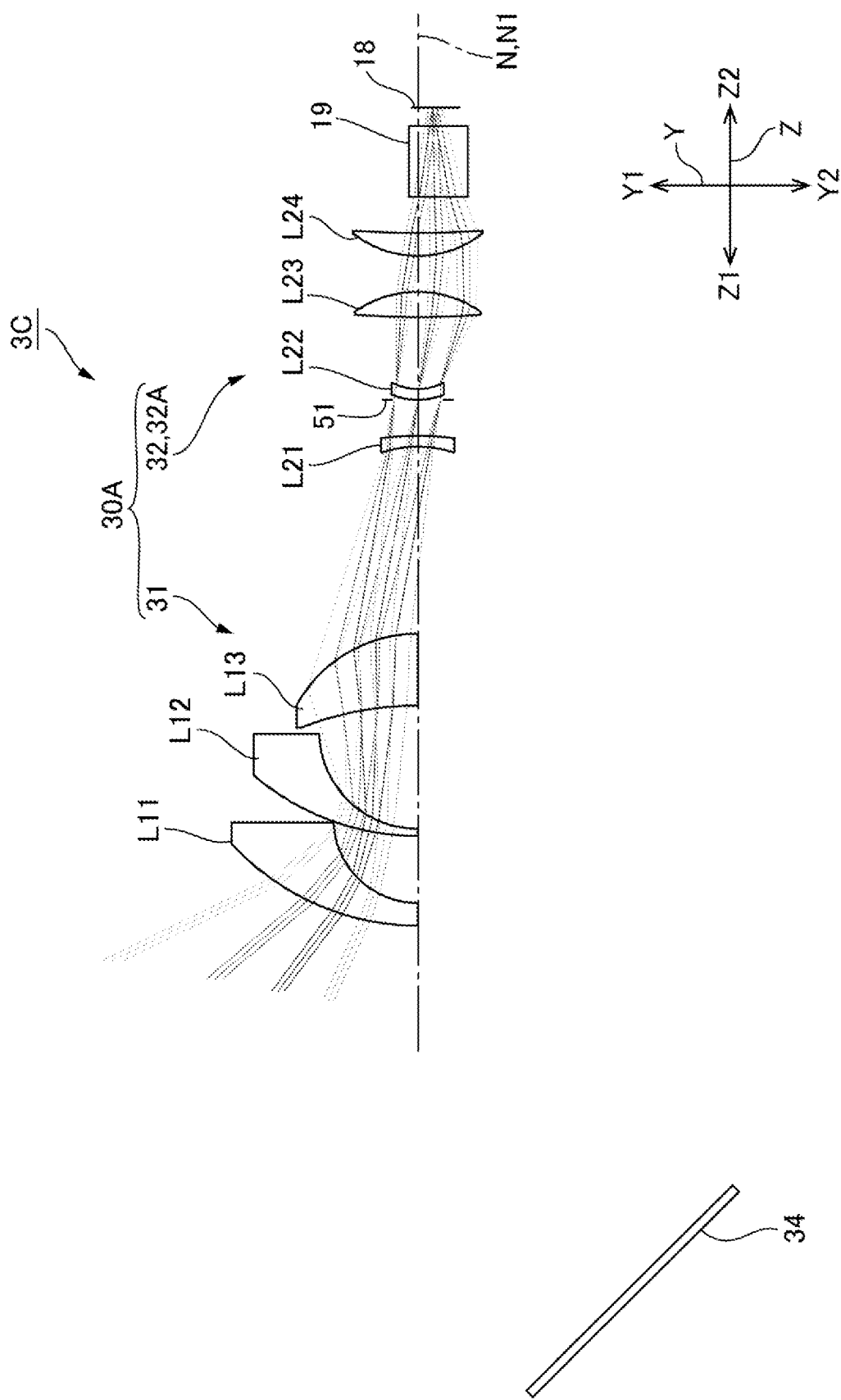
FIG. 13 is a ray diagram of the projection mechanism in a first form in Example 3.
Figure 14:
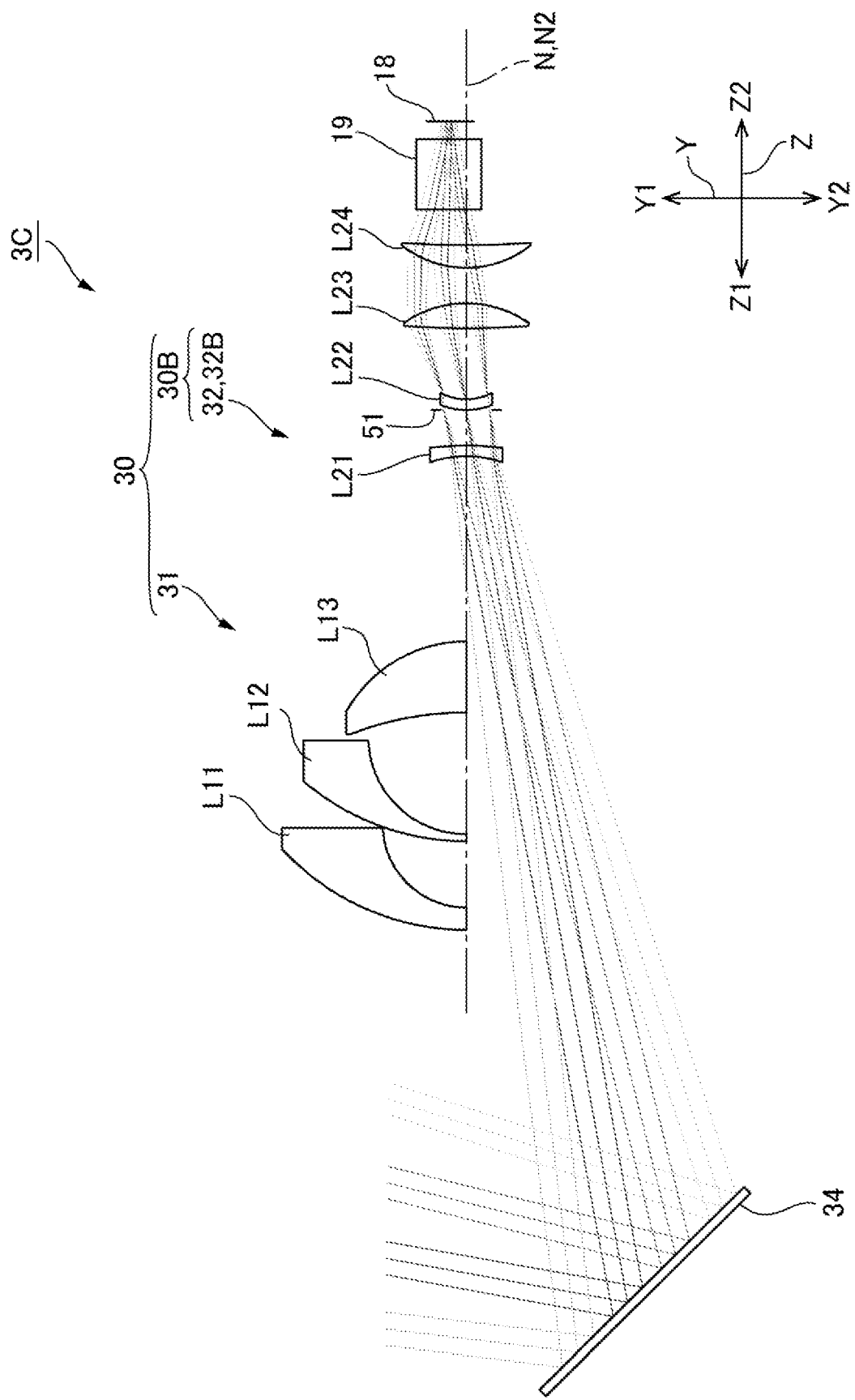
FIG. 14 is a ray diagram of the projection mechanism in a second form in Example 3.

FIG. 12 is a ray diagram schematically showing an entire projection mechanism 3C of Example 3. FIG. 13 is a ray diagram of the projection mechanism 3C in a first form of Example 3. FIG. 14 is a ray diagram of the projection mechanism 3C in a second form of Example 3. Note that, in FIG. 12, rays of the projection mechanism 3C in the first form and rays of the projection mechanism 3C in the second form are superimposed. The projection mechanism 3C of Example 3 is different from the projection mechanism 3A of Example 1 in that a second reflection member 34 is provided. Note that the other configurations of the projection mechanism 3C of Example 3 are the same as those of the projection mechanism 3A of Example 1 and the corresponding configurations have the same signs and the explanation thereof will be omitted.

As shown in FIG. 12, the projection mechanism 3C includes the second reflection member 34 placed at the enlargement side of the second projection system 30B and changing the projection direction of the second projection system 30B. The projection mechanism 3C projects the first enlarged image projected from the first optical system 31 on the first screen S1 located in a first projection position in the first form and deflects the projection direction of the the second enlarged image projected from the second optical system 32 by the second reflection member 34 and projects the second enlarged image on the second screen S2 located in a second position different from the first position in the second form. In this example, the first screen S1 and the second screen S2 are orthogonal and the first screen S1 is located in the downward direction Y2 of the second screen S2.

As shown in FIG. 12, the projection mechanism 3C of the first form and the projection mechanism 3C of the second form are different in angle of view, and the projection mechanism 3C of the first form can project at a wider angle than the projection mechanism 3C of the second form. In FIG. 12, luminous fluxes reaching the respective screens S from the projection mechanism 3C of this example are schematically shown by luminous fluxes F1 to F4. The luminous flux F1 is the luminous flux reaching a position at the lowest image height. The luminous flux F4 is the luminous flux reaching a position at the highest image height. The luminous fluxes F2 and F3 are luminous fluxes reaching positions between the luminous flux F1 and the luminous flux F4. Further, as shown in FIG. 12, the first projection distance of the projection mechanism 3C of the first form is shorter than the second projection distance of the projection mechanism 3C of the second form.

First Form of Example 3

As shown in FIGS. 12 and 13, in the projection mechanism 3C of the first form, the projection system 30 is placed in the first position 32A by the shift mechanism.

As shown in FIG. 13, when the projection system 30 is in the first position 32A, the optical axis N1 of the projection system 30 is located in the upward direction Y1 of the liquid crystal panel 18. That is, the liquid crystal panel 18 is located in the downward direction Y2 with respect to the optical axis N1 of the projection system 30.

As shown in FIGS. 12 and 13, the beam output from the liquid crystal panel 18 passes through the second optical system 32, and then, travels in the upward direction Y1 of the optical axis N1. The beam output from the second optical system 32 passes through the first optical system 31, and then, is enlarged and projected in the upward direction Y1 and reaches the first screen S1. That is, the projection mechanism 3C passes the projection image light through the first projection system. 30A including the second optical system. 32 and the first optical system 31 and projects the first enlarged image on the first screen S1.

Second Form of Example 3

As shown in FIGS. 12 and 14, in the projection mechanism 3C of the second form, the projection system 30 is placed in the second position 32B by the shift mechanism.

The second reflection member 34 is placed in the downward direction Y2 of the optical axis N of the projection system 30 and in the first direction Z1 of the first optical system 31. The second reflection member 34 includes a planar mirror. The second reflection member 34 inclines in the downward direction Y2 toward the second direction Z2.

As shown in FIG. 14, when the projection system 30 is in the second position 32B, the optical axis N2 of the projection system 30 is located in the downward direction Y2 of the liquid crystal panel 18. That is, the liquid crystal panel 18 is located in the upward direction Y1 with respect to the optical axis N2 of the projection system 30.

As shown in FIGS. 12 and 14, the beam output from the liquid crystal panel 18 passes through the second optical system 32, and then, travels in the downward direction Y2 of the optical axis N2. The beam output from the second optical system 32 is folded in the upward direction Y1 and the second direction Z2 by the second reflection member 34. The beam deflected by the second reflection member 34 is enlarged and projected in the upward direction Y1 and the second direction Z2 and reaches the second screen S2. That is, the projection mechanism 3C passes the projection image light through the second projection system 3 OB, including only the second optical system 32, and the second reflection member 34 and projects the second enlarged image on the second screen S2 at an angle of view different from the angle of view of the first projection system 30A.

Functions and Effects

The projector 1 of this example includes the second reflection member 34 placed at the enlargement side of the second projection system 30B and changing the projection direction of the second projection system 30B. Accordingly, the projector 1 of this example may change the position of the second screen S2 by the second reflection member 34. Further, the projector 1 of this example has the same configurations as those of the projector 1 of Example 1 except that the projection mechanism 3C includes the second reflection member 34, and may obtain the same functions and effects as those of the projector 1 of Example 1.

OTHER EMBODIMENTS

In the above described embodiment, when the second optical system 32 is shifted by the shift mechanism 41, the first optical system 31 moves integrally with the second optical system 32, however, the first optical system 31 may be fixed. In this case, the holding portion 42 holds only the second optical system 32. The shift mechanism 41 shifts only the second optical system 32 in the directions orthogonal to the optical axis N of the second optical system 32 relative to the liquid crystal panel 18. Further, when the second optical system 32 is in the first position 32A, the optical axis of the first optical system 31 is aligned with the optical axis N of the second optical system 32, and, when the second optical system 32 is in the second position 32B, the optical axis of the first optical system 31 is not aligned with the optical axis N of the second optical system 32. According to the configuration, the shift mechanism 41 shifts only the second optical system 32, and thereby, compared to a case where the first optical system 31 and the second optical system 32 are shifted, the configuration may be simplified.

The drive mechanism 44 may have a configuration to manually move the holding portion 42.

The projection mechanism 3 may include both the first reflection member 33 and the second reflection member 34. Further, the first reflection member 33 and the second reflection member 34 may be mirrors having curved surfaces such as concave surfaces or convex surfaces.

What is claimed is:

1. A projector comprising:
a light modulation device forming a projection image; and
a projection mechanism for enlarging and projecting a projection image light of the projection image output from the light modulation device, wherein
the projection mechanism has a first optical system, a second optical system located between the first optical system and the light modulation device, and a shift mechanism shifting the second optical system relative to the light modulation device,
the shift mechanism shifts the second optical system to a first position and a second position different from the first position in directions orthogonal to an optical axis of the second optical system,
when the second optical system is in the first position, the projection mechanism passes the projection image light through a first projection system including the second optical system and the first optical system and projects a first enlarged image of the projection image on a first projection position, and
when the second optical system is in the second position, the projection mechanism passes the projection image light through a second projection system including only the second optical system and projects a second enlarged image of the projection image on a second projection position different from the first projection position at an angle of view different from an angle of view of the first projection system.

2. The projector according to claim 1, wherein
when the second optical system is shifted by the shift mechanism, the first optical system moves integrally with the second optical system.

3. The projector according to claim 1, wherein
the first optical system is fixed.

4. The projector according to claim 1, wherein
when a projection distance of the first projection system is a first projection distance and a projection distance of the second projection system is a second projection distance, the second projection distance is three or more times the first projection distance.

5. The projector according to claim 1, wherein
when a half angle of view of the first projection system is a first angle of view and a half angle of view of the second projection system is a second angle of view, the first angle of view is three or more times the second angle of view.

6. The projector according to claim 1, wherein the projection mechanism includes a first reflection member placed at an enlargement side of the first projection system and changing a projection direction of the first projection system.

7. The projector according to claim 1, wherein the projection mechanism includes a second reflection member placed at an enlargement side of the second projection system and changing a projection direction of the second projection system.

8. The projector according to claim 1, further comprising a control section, wherein the shift mechanism includes a holding portion holding the second optical system, a supporting portion movably supporting the holding portion in directions orthogonal to the optical axis, and a drive unit moving the holding portion to place the second optical system in the first position or the second position, and the control section includes a shift control unit drivingly controlling the drive unit to place the second optical system in the first position or the second position.

9. The projector according to claim 8, wherein the shift mechanism includes a selection unit for selectively placing the second optical system in the first position or the second position, and when placement of the second optical system in the first position is selected by the selection unit, the shift control unit drivingly controls the drive unit to place the second optical system in the first position, and, when placement of the second optical system in the second position is selected by the selection unit, drivingly controls the drive unit to place the second optical system in the second position.

* * * * *